United States Patent [19]

Meisenburg

[11] Patent Number: 4,875,884
[45] Date of Patent: Oct. 24, 1989

[54] MARINE PROPULSION DEVICE WITH THRU-TRANSOM ENGINE OIL DRAIN SYSTEM

[75] Inventor: Gary L. Meisenburg, Fond du Lac, Wis.

[73] Assignee: Brunswick Corporation, Skokie, Ill.

[21] Appl. No.: 276,378

[22] Filed: Nov. 23, 1988

[51] Int. Cl.⁴ ........................................... B63H 21/38
[52] U.S. Cl. ..................................... 440/88; 114/197; 184/1.5
[58] Field of Search ......................... 440/88, 111, 112; 114/197; 184/1.5

[56] References Cited

U.S. PATENT DOCUMENTS

| | | | |
|---|---|---|---|
| 3,743,053 | 7/1973 | Kuklewicz | 184/1.5 |
| 3,908,797 | 9/1975 | Schnepp | 184/1.5 |
| 4,371,351 | 2/1983 | Tousey | 440/88 |
| 4,728,306 | 3/1988 | Schneider | 440/88 |

Primary Examiner—Sherman D. Basinger
Assistant Examiner—Thomas J. Brahan
Attorney, Agent, or Firm—Andrus, Sceales, Starke & Sawall

[57] ABSTRACT

A fluid flow tube (9) is provided which extends from the lower portion of the engine oil pan (7) to a point on the boat transom (2) below the pan. The upper end portion of the tube is connected through a control valve (10) which communicates with the pan interior. The lower or discharge tube end portion is connected through a fitting (11) extending through the transom. A removable plug (17) is associated with the fitting and, when removed, permits oil to drain out through the transom and into an oil collection receptacle when the control valve is open.

4 Claims, 1 Drawing Sheet

MARINE PROPULSION DEVICE WITH THRU-TRANSOM ENGINE OIL DRAIN SYSTEM

BACKGROUND AND SUMMARY OF THE INVENTION

This invention is directed to marine propulsion devices which generally utilize an internal combustion engine mounted inboard of the boat and often disposed adjacent the transom at the boat stern. A stern drive unit is usually mounted externally of the transom and is suitably connected through the transom to the engine. The engine is normally mounted above the floor of the boat and is provided with an oil pan which depends downwardly therefrom.

Heretofore, when it has been desired to change the engine oil, it has usually been necessary to utilize a pump which sucks the oil out of the oil pan. This requires an investment in additional and often expensive equipment. In addition, it has been found that pumping the oil out through the usual dip stick tube does not remove undesirable contaminents which tend to collect at the bottom of the oil pan.

It is an object of the present invention to eliminate the need for a pumping system to remove the used oil from the oil pan during an oil change, and yet provide for full removal of the oil from the boat. It is a further object to provide an oil removal system which is extremely simple and inexpensive in construction.

In accordance with the various aspects of the invention and in the present embodiment, a fluid flow tube is provided and which extends from the lower portion of the oil pan to a point on the transom below the pan. The upper end portion of the tube is connected through a control valve which communicates with the pan interior. The lower or discharge tube and portion is connected through a fitting extending through the transom. A removable plug is associated with the fitting and, when removed, permits oil to drain out through the transom and into an oil collection receptacle when the control valve is open.

BRIEF DESCRIPTION OF THE DRAWINGS

The accompanying drawings illustrate the best mode presently contemplated by the inventor for carrying out the invention.

In the drawings.

DESCRIPTION OF THE PREFERRED EMBODIMENT

Figure 1:
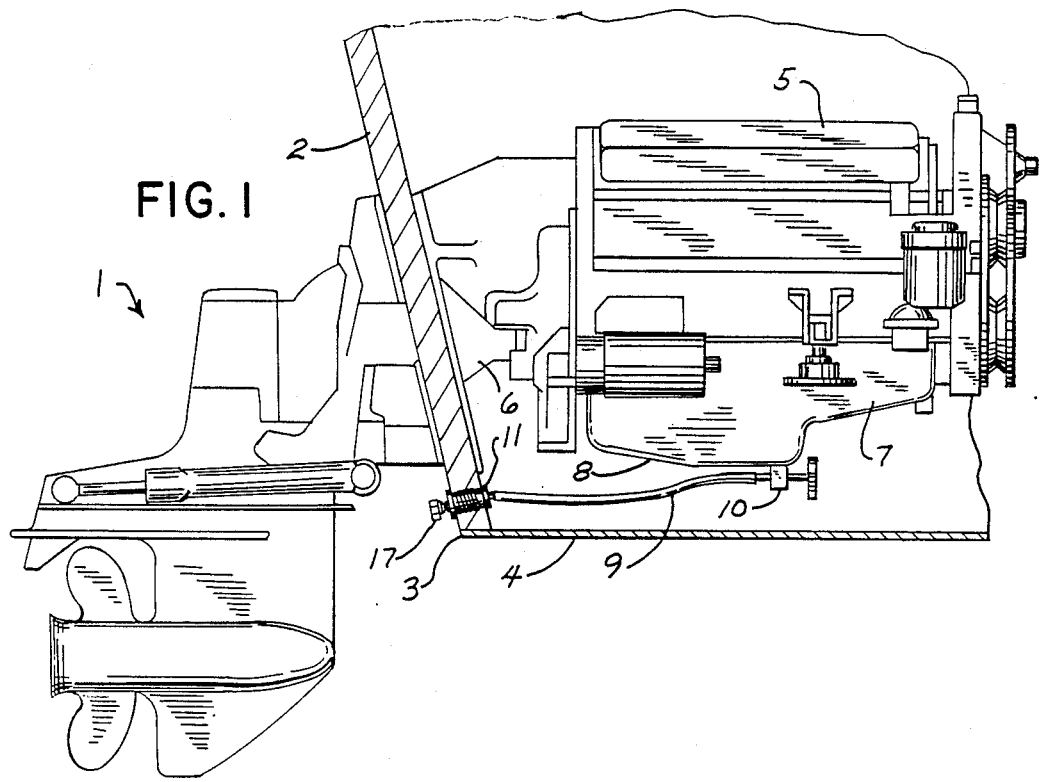
FIG. 1 is a generally schematic side elevational view of a marine propulsion device incorporating the various aspects of the invention.

As best shown in FIG. 1 of the drawings, the various aspects of the invention are contemplated for use in connection with a marine propulsion device which in the present instance includes a stern drive unit 1 adapted to be suitably mounted to the transom 2 of a boat 3 having a floor 4. An internal combustion marine engine 5 is disposed inboard of boat 3 adjacent the stern thereof and also adjacent transom 2. Engine 5 includes a drive output 6 which extends through the transom to unit 1 in the usual manner.

The marine propulsion device and engine 5 include the usual circulating oil system, and an oil pan 7 having a bottom 8 is suitably suspended from the engine so that it extends downwardly toward boat floor 4.

In accordance with various aspects of the invention, means are provided for selectively draining oil by gravity from oil pan 7 and through transom 2 for subsequent collection. For this purpose, and in the present embodiment, a flexible fluid flow tube 9 is provided and which extends from adjacent pan bottom 8 to a point on the interior of transom 2 which is below the oil pan. A manually operable control valve 10 is mounted to pan bottom 8 and communicates with the lower portion of the pan interior. The upper inlet end of tube 9 is suitably and removable connected to valve 10.

Figure 2:
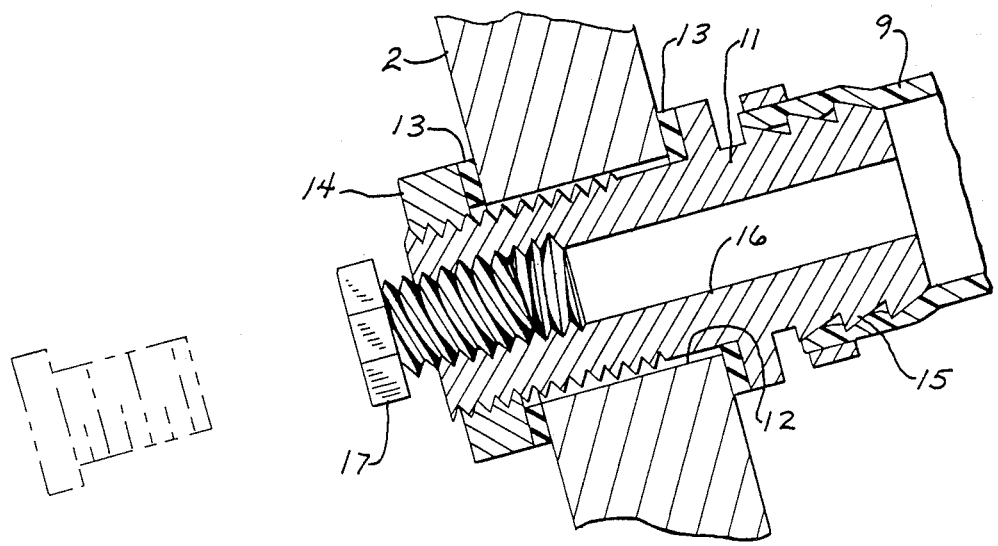
FIG. 2 is an enlarged fragmentary sectional view of the through-transom fitting.

In addition, the lower end of tube 9 is connected for discharging through transom 2. For this purpose, and in the present embodiment, a tubular fitting 11 extends through an opening 12 in the lower portion of the transom. See especially FIG. 2. Fitting 11 is suitably sealed to the transom, as by annular sealing rings 13, and is held in place by a nut 14 threaded to the outboard fitting end. The inboard fitting end is barbed, as at 15, and receives the lower end of tube 9 thereover.

Fitting 11 is provided with a flow passage 16 therein for oil drainage therethrough. Passage 16 is selectively pluggable adjacent its outer end by a manually removable plug 17 which is threaded into the interior of the passage.

Fitting 11 and plug 17 are preferably made of brass or other suitable non-corrosive material.

During normal operation of the marine propulsion device, control valve 10 is set to closed position and plug 17 closes passage 16, thus isolating the interior of tube 9, which is usually empty. When it is desired to drain used oil from pan 7 during an oil changing operation, valve 10 is first opened and then plug 17 is removed from fitting 11 as shown in phantom in FIG. 2. Oil will then be free to drain by gravity from oil pan 7 and through tube 9 and fitting passage 16 in transom 2, and hence can dump into a bucket or the like at the drydock. Since oil drains out from the bottom of oil pan 7, a substantial amount of grit or other contaminants present in the pan will be carried out with the oil. When the oil is completely drained, valve 10 is closed and plug 17 is threaded back into fitting 11.

The aspects of the invention provide a simple yet effective system for draining oil from the inboard engine of a marine propulsion device.

Various modes of carrying out the invention are contemplated as being within the scope of the accompanying claims which particularly point out and distinctly claim the subject matter of the invention.

I claim:

1. In a marine propulsion device, the combination comprising:
   (a) a boat (3) having a transom (2) at its stern end,
   (b) a marine internal combustion engine (5) disposed inboard of said boat,
   (c) an oil pan (7) mounted to said engine,
   (d) and means (9–11) for draining oil by gravity from said oil pan and through said transom to the exterior of said boat.

2. The combination of claim 1 in which said oil draining means includes:
   (a) a flexible fluid flow tube (9) extending between said oil pan (7) and said transom (2),
   (b) a control valve (10) communicating between the interior of said oil pan and one end portion of said tube, (c) and pluggable oil passage means (11) communicating with the other end portion of said tube and extending through said transom below the level of said oil pan to the exterior of said boat for oil discharge therefrom.

3. The combination of claim 2:

(a) in which said oil passage means includes a tubular fitting (11) extending inboardly-to-outboardly through an opening (12) in said transom (2), (b) and a plug (17) mounted in said fitting, said plug being removable from said fitting so that oil discharges therethrough when said control valve (10) is opened.

4. The combination of claim 3 in which said control valve (10) is mounted to said oil pan (7) so as to communicate with the lower portion of the oil pan interior for removing contaminents from the latter.

* * * * *